(12) United States Patent
Mathew et al.

(10) Patent No.: US 11,441,545 B2
(45) Date of Patent: Sep. 13, 2022

(54) TUNGSTEN-BASED EROSION-RESISTANT LEADING EDGE PROTECTION CAP FOR ROTOR BLADES

(71) Applicant: General Electric Company, Schenectady, NY (US)

(72) Inventors: Paul Mathew, Bangalore (IN); Sriram Krishnamurthy, Bangalore (IN); Shanmuga Priyan Subramanian, Hamburg (DE)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 16/799,939

(22) Filed: Feb. 25, 2020

(65) Prior Publication Data

US 2021/0262350 A1 Aug. 26, 2021

(51) Int. Cl.
*F03D 80/30* (2016.01)
*F03D 1/06* (2006.01)
*B64C 11/20* (2006.01)

(52) U.S. Cl.
CPC ............ *F03D 80/30* (2016.05); *F03D 1/0675* (2013.01); *B64C 11/205* (2013.01);
(Continued)

(58) Field of Classification Search
CPC .................... B64C 3/26; B64C 27/023; F05B 2280/10301
See application file for complete search history.

(56) References Cited

U.S. PATENT DOCUMENTS 2,389,760 A * 11/1945 Brierley ................ B64C 11/205
416/224
2,637,404 A * 5/1953 Bart ...................... B64C 11/205
416/229 R (Continued)

FOREIGN PATENT DOCUMENTS

CN 102400718 A * 4/2012 ........... C23C 28/322
CN 108005848 A 5/2018
(Continued)

OTHER PUBLICATIONS

Danoon et al., On the Integration of Lightning Protection with Stealth Coated Wind Turbine Blades, Wind Energy, Jul. 16, 2013, pp. 1577-1585.

(Continued)

*Primary Examiner* — Topaz L. Elliott
(74) *Attorney, Agent, or Firm* — Dority & Manning, P.A.

(57) ABSTRACT

A rotor blade assembly for a wind turbine includes at least one rotor blade having surfaces defining a pressure side, a suction side, a leading edge, and a trailing edge extending between a blade tip and a blade root. The surfaces are constructed of a polymeric composite material. The rotor blade assembly also includes a protection cap arranged adjacent to one or more of the surfaces of the rotor blade so as to cover at least a portion of the one or more surfaces of the rotor blade. The protection cap includes a body defining an overall length. Further, at least a first segment of the protection cap is constructed of a tungsten-based metal. Thus, the protection cap is configured to reduce erosion and resist corrosion of the rotor blade caused by particle or liquid impact.

5 Claims, 9 Drawing Sheets

(52) U.S. Cl.
CPC ....... *F05B 2230/22* (2013.01); *F05B 2230/26* (2013.01); *F05B 2230/31* (2013.01); *F05B 2230/90* (2013.01); *F05B 2240/303* (2020.08); *F05B 2240/307* (2020.08); *F05B 2240/3062* (2020.08); *F05B 2260/30* (2013.01); *F05B 2260/95* (2013.01); *F05B 2280/107* (2013.01); *F05B 2280/1021* (2013.01); *F05B 2280/1071* (2013.01); *F05B 2280/10301* (2013.01); *F05B 2280/10304* (2013.01); *F05B 2280/2003* (2013.01); *F05B 2280/4003* (2013.01); *F05B 2280/4007* (2013.01); *F05B 2280/5006* (2013.01); *F05B 2280/6003* (2013.01)

(56) References Cited

U.S. PATENT DOCUMENTS

| | | | | |
|---|---|---|---|---|
| 2,776,254 | A | * | 1/1957 | Bart ............. B64C 11/205 205/164 |
| 3,357,850 | A | * | 12/1967 | Baker ............ F01D 5/288 416/229 A |
| 5,306,120 | A | * | 4/1994 | Hammer ............ C23C 4/02 416/224 |
| 6,843,928 | B2 | * | 1/2005 | Cline ............. C23F 1/26 216/96 |
| 7,300,708 | B2 | | 11/2007 | Gigliotti, Jr. et al. |
| 7,435,056 | B2 | | 10/2008 | Liston |
| 7,758,314 | B2 | | 7/2010 | Wilson et al. |
| 7,896,616 | B2 | | 3/2011 | Livingston et al. |
| 8,632,306 | B2 | | 1/2014 | Olsen |
| 9,016,989 | B2 | * | 4/2015 | Nagabhushana ....... B60P 3/40 410/44 |
| 9,157,139 | B2 | | 10/2015 | Ragagopalan |
| 9,279,328 | B2 | * | 3/2016 | Roy ............... B23K 26/24 |
| 9,404,172 | B2 | | 8/2016 | Clavette et al. |
| 9,429,025 | B2 | | 8/2016 | Harris, Jr. et al. |
| 9,644,613 | B2 | | 5/2017 | Erichsen |
| 9,920,631 | B2 | * | 3/2018 | Tellier ............ B23P 17/00 |
| 10,035,578 | B2 | | 7/2018 | Nordin et al. |
| 10,408,083 | B2 | * | 9/2019 | Prentice ........... B22F 5/04 |
| 2004/0225079 | A1 | * | 11/2004 | Wiedemann ........ C09D 183/04 525/477 |
| 2005/0207896 | A1 | | 9/2005 | Gigliotti, Jr. et al. |
| 2007/0036659 | A1 | * | 2/2007 | Hibbard ........... B29C 63/22 416/233 |
| 2009/0092842 | A1 | * | 4/2009 | Hoover ............ B32B 3/04 428/435 |
| 2010/0034661 | A1 | | 2/2010 | Rajagopalan |
| 2010/0080958 | A1 | * | 4/2010 | Goelling .......... B32B 15/18 428/172 |
| 2011/0059290 | A1 | | 3/2011 | Gage et al. |
| 2011/0142678 | A1 | | 6/2011 | Santiago et al. |
| 2011/0189014 | A1 | | 8/2011 | Hiller |
| 2012/0003094 | A1 | * | 1/2012 | Hansen ............ F03D 1/0675 416/146 R |
| 2013/0028742 | A1 | * | 1/2013 | Watanabe .......... F03D 3/005 416/219 R |
| 2013/0071252 | A1 | | 3/2013 | Nissen |
| 2013/0101423 | A1 | * | 4/2013 | Roy ............... F04D 29/324 416/223 R |
| 2013/0259698 | A1 | * | 10/2013 | Jones ............. F01D 5/286 416/224 |
| 2014/0072715 | A1 | | 3/2014 | Jones et al. |
| 2014/0186188 | A1 | * | 7/2014 | Takeuchi .......... F03D 1/0675 416/224 |
| 2014/0272166 | A1 | | 9/2014 | Shim et al. |
| 2015/0026980 | A1 | * | 1/2015 | Tellier ............ F01D 25/00 29/889.1 |
| 2015/0037112 | A1 | * | 2/2015 | Nagabhushana ....... B60P 3/40 410/44 |
| 2015/0083281 | A1 | | 3/2015 | Lipkin et al. |
| 2015/0086376 | A1 | * | 3/2015 | Fandrei, II ........ F01D 5/28 416/224 |
| 2016/0059967 | A1 | * | 3/2016 | Tjeenk Willink ..... F01D 5/288 427/230 |
| 2016/0115820 | A1 | * | 4/2016 | Prentice .......... F01D 5/147 415/200 |
| 2016/0348643 | A1 | * | 12/2016 | Fujioka ........... F03D 80/30 |
| 2017/0122287 | A1 | * | 5/2017 | Dobbe ............. B29C 66/721 |
| 2018/0029699 | A1 | * | 2/2018 | Nissen ............ B64C 27/473 |
| 2018/0223795 | A1 | * | 8/2018 | Tobin ............. B29C 64/10 |
| 2018/0245202 | A1 | | 8/2018 | Gorokhovsky et al. |
| 2019/0162171 | A1 | | 5/2019 | Jensen et al. |
| 2020/0063718 | A1 | * | 2/2020 | Ruijter ........... F03D 1/0683 |
| 2020/0072190 | A1 | * | 3/2020 | Buchanan ......... F03D 3/068 |
| 2021/0147060 | A1 | * | 5/2021 | Sommerer ......... B64C 3/36 |
| 2021/0207576 | A1 | * | 7/2021 | Larsen ............ F03D 1/0675 |

FOREIGN PATENT DOCUMENTS

| | | | | |
|---|---|---|---|---|
| EP | 2230330 | A1 | * 9/2010 | .......... C23C 28/322 |
| EP | 2853483 | A2 | 4/2015 | |
| JP | 2012246812 | A | * 12/2012 | .......... F03D 80/30 |
| JP | 2012246815 | A | * 12/2012 | .......... F03D 1/0675 |
| KR | 102338703 | | * 12/2021 | .......... F03D 1/0675 |
| WO | WO 2018/059763 | A1 | 4/2018 | |
| WO | WO-2018157929 | A1 | * 9/2018 | .......... F03D 1/0675 |
| WO | WO-2019134862 | A1 | * 7/2019 | .......... F03D 80/00 |
| WO | WO2019/086848 | A3 | 9/2019 | |
| WO | WO-2019179583 | A1 | * 9/2019 | .......... F03D 1/0675 |
| WO | WO 2019/228599 | A1 | 12/2019 | |
| WO | WO-2020231828 | A1 | * 11/2020 | ........ B29D 99/0028 |

OTHER PUBLICATIONS

Dellacorte, Ni—Ti Alloys for Aerospace Bearing Applications, NASA, 6th World Tribology Congress, Beijing, China, Sep. 17, 2017, 29 Pages.

Lammel et al., Analysis of Rain Erosion Resistance of Electroplated Nickel-tungsten Alloy Coatings, Surface and Coatings Technology, vol. 206, Issues 89, Jan. 15, 2012, pp. 2545-2551. (Abstract Only).

Lockney, Metalworking Techniques Unlock a Unique Alloy, NASA Technology Transfer Program, Spinoff, 3 Pages. https://spinoff.nasa.gov/Spinoff2015/ip_4.html.

Naresh et al., Shape Memory Alloys: A State of Art Review, IOP Science, IOP Conf Series: Materials Science and Engineering, vol. 149, 2016, 14 Pages.

Trexler et al., Development of a Novel Erosion Resistant Coating System for Use on Rotorcraft Blades, AHS International 68th Annual Forum & Technology Display, May 2012, pp. 1-10.

Yokoyama, Lightning Protection of Wind Turbine Generation Systems, 2011 7th Asia-Pacific International Conference on Lightning, Chengdu, China, Nov. 1-4, 2011, pp. 941-947. (Abstract Only).

International Search Report for PCT Application No. PCT/US2021/018317, dated Jun. 15, 2021.

\* cited by examiner

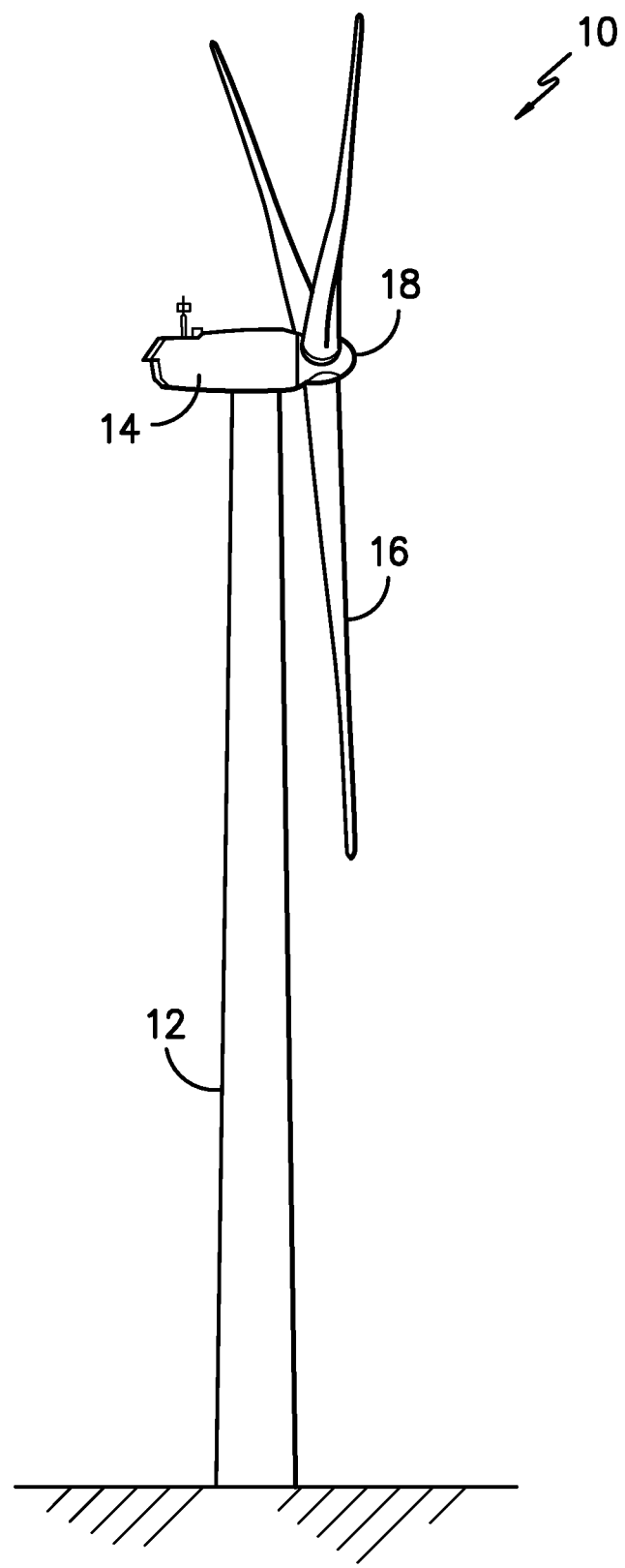
FIG. -1-

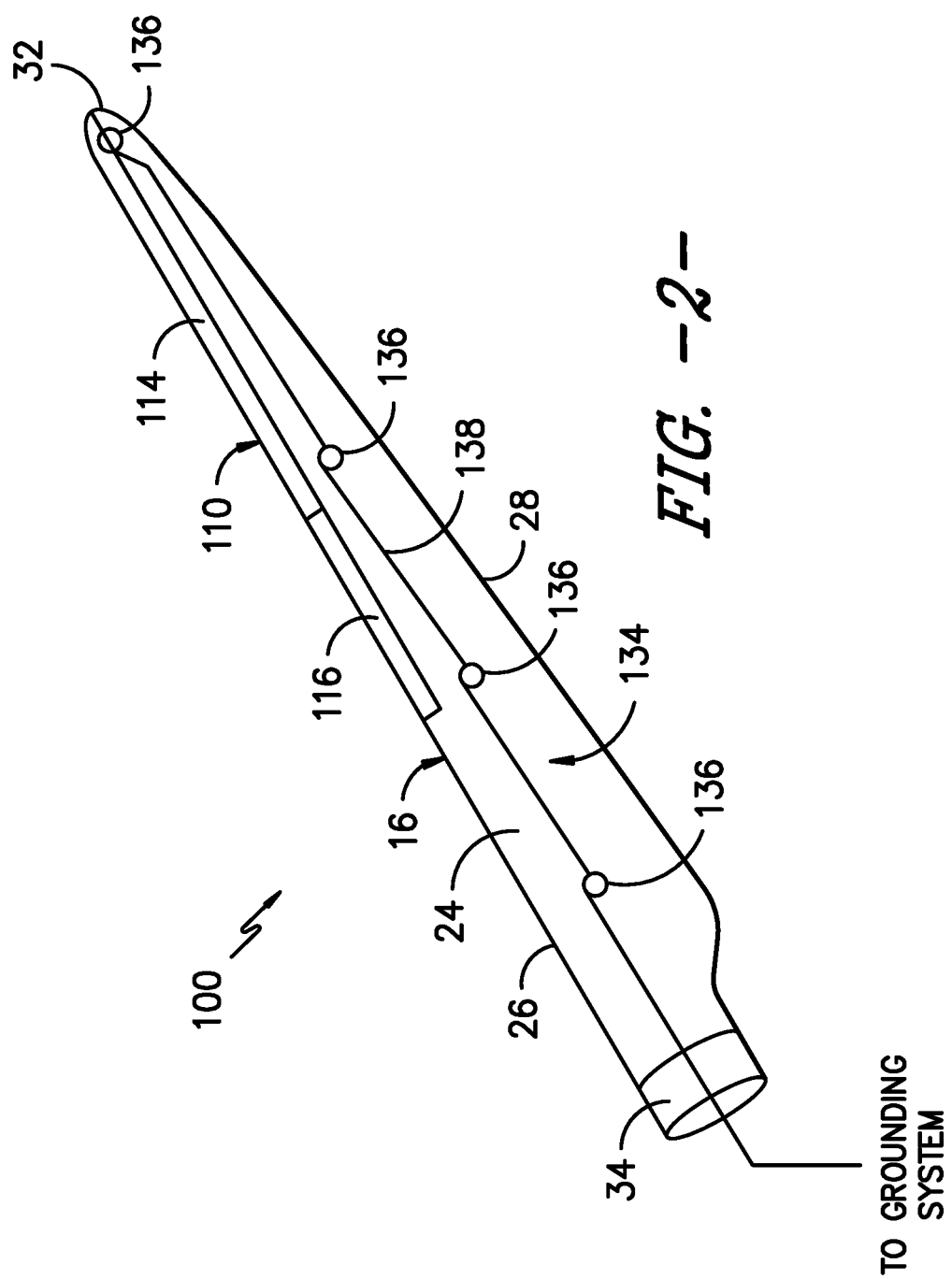
FIG. -2-

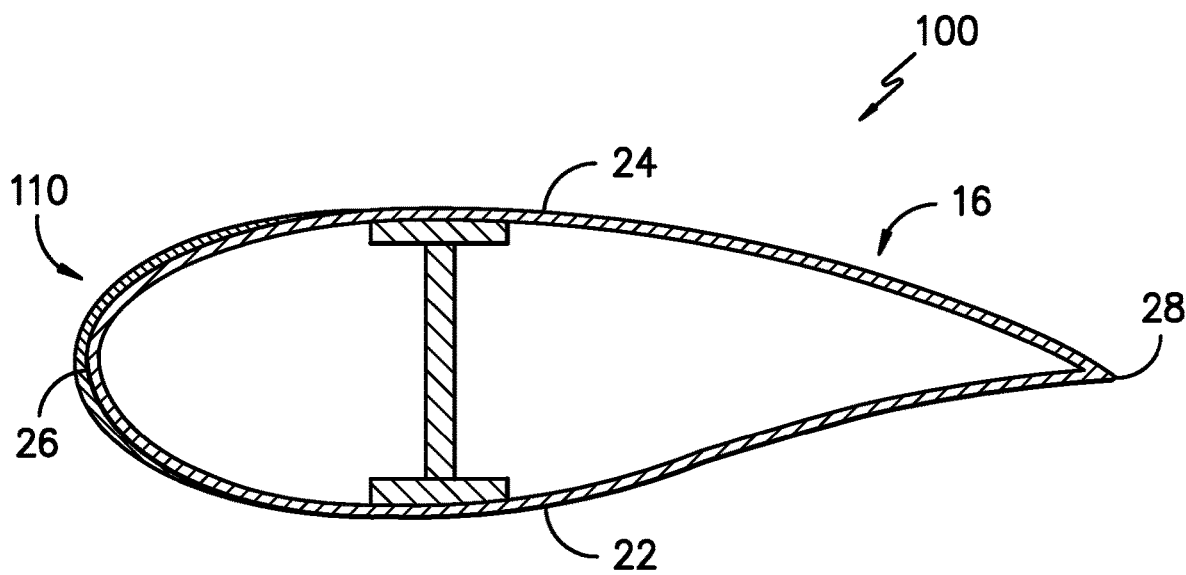
FIG. -3-
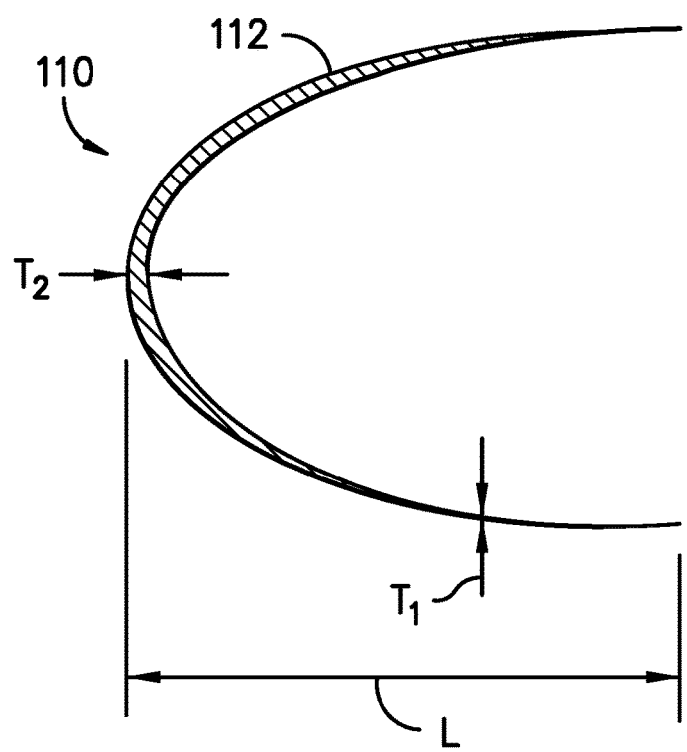
FIG. -4-

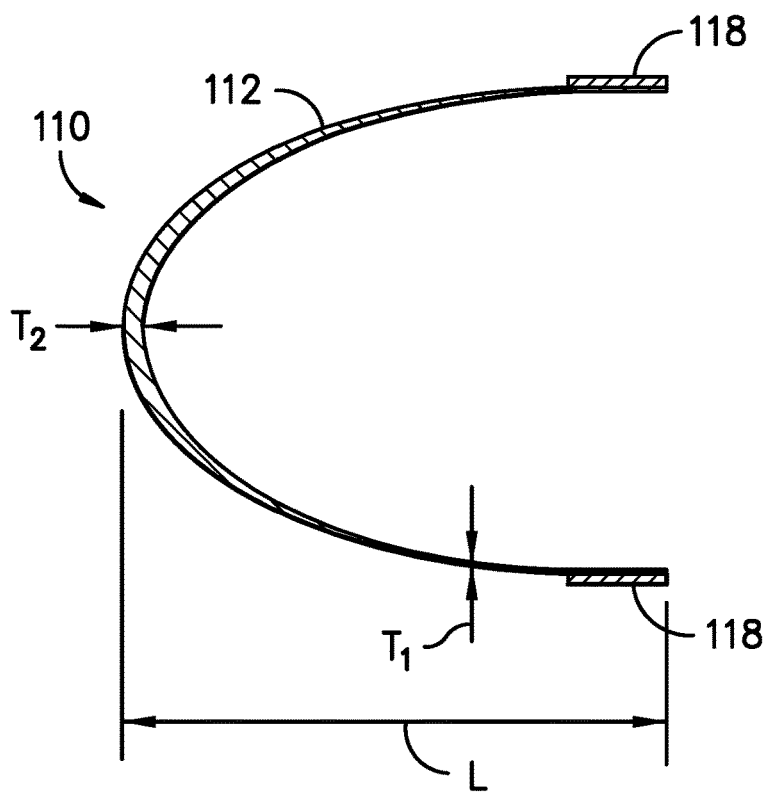
FIG. -5-
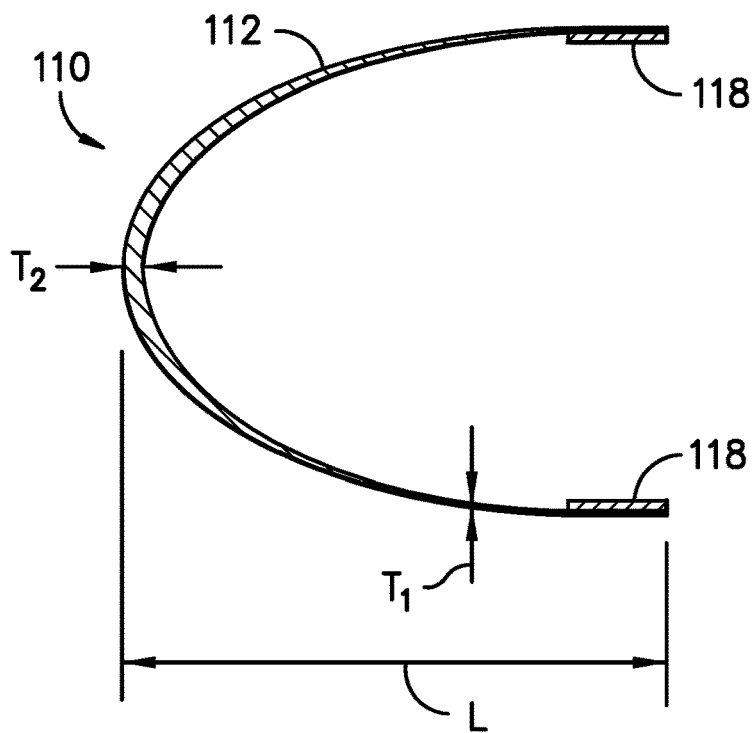
FIG. -6-

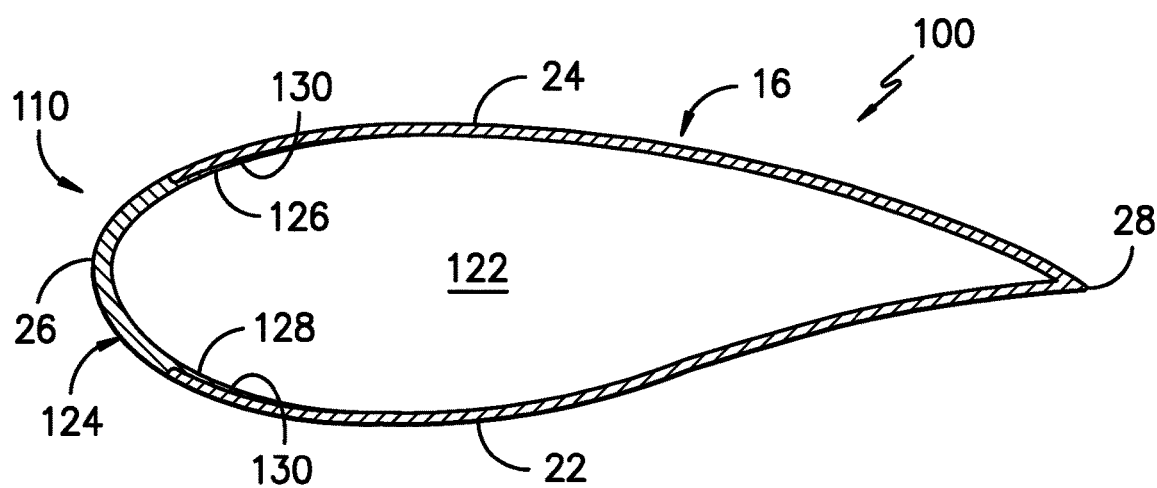
FIG. -7-
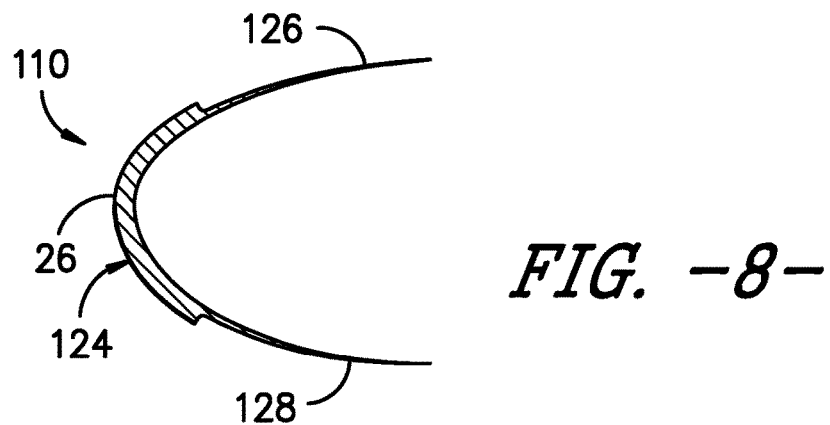
FIG. -8-
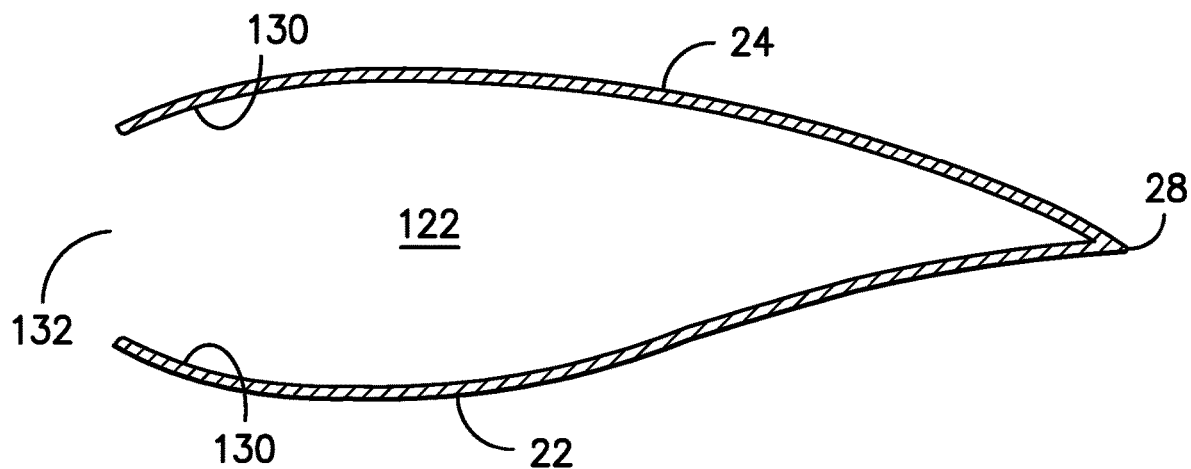
FIG. -9-

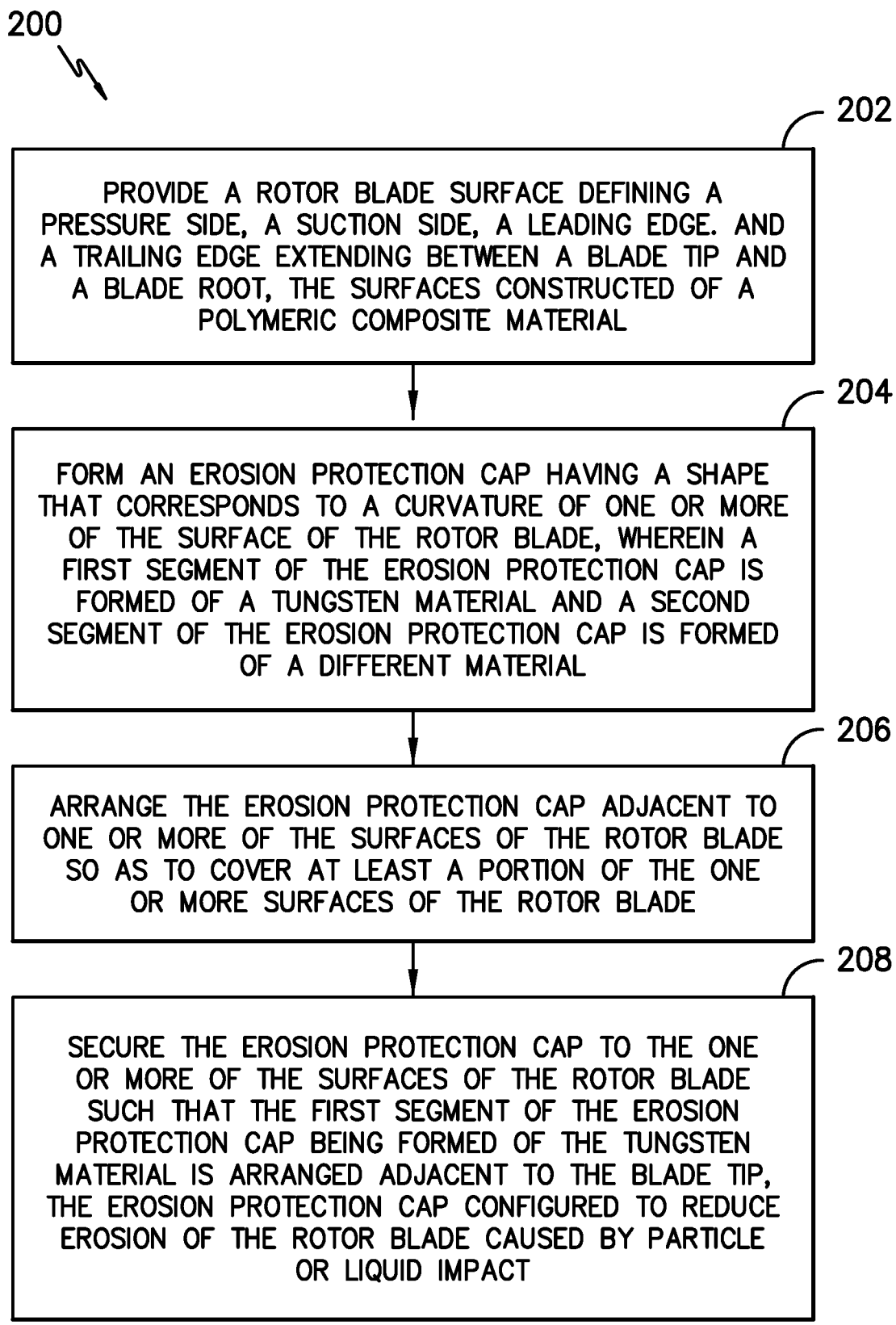
FIG. -10-

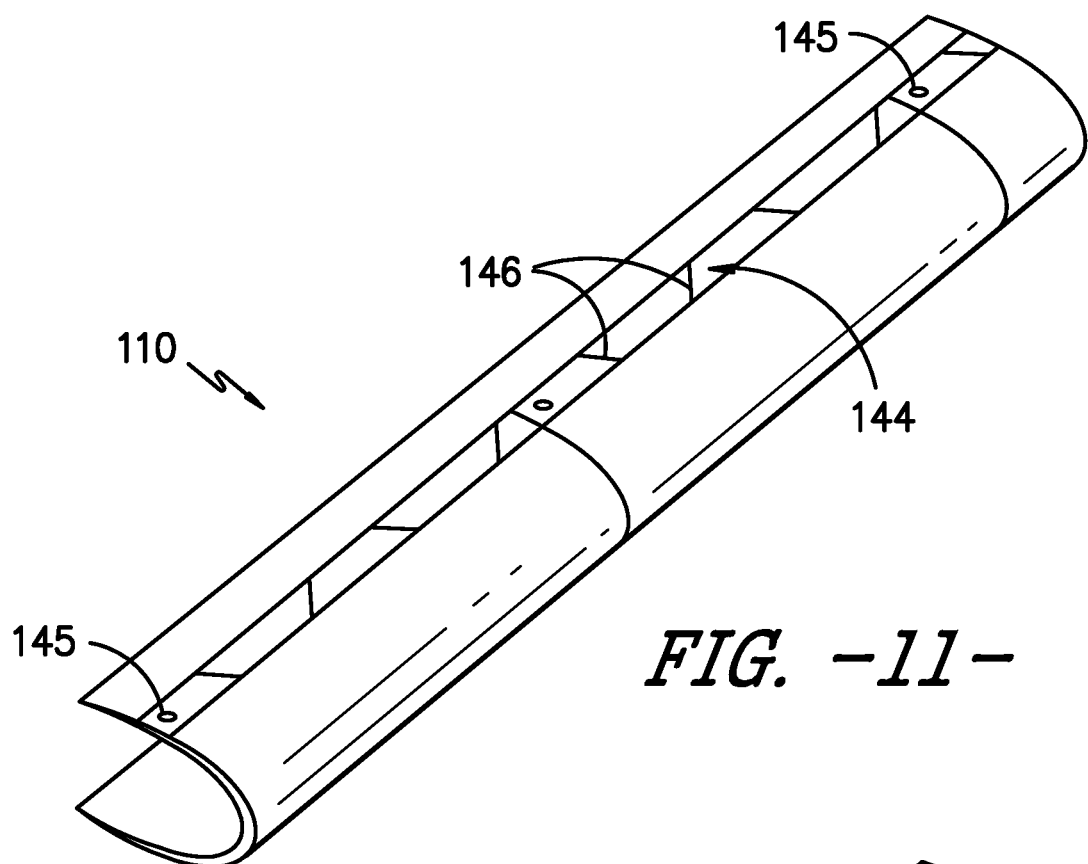
FIG. -11-
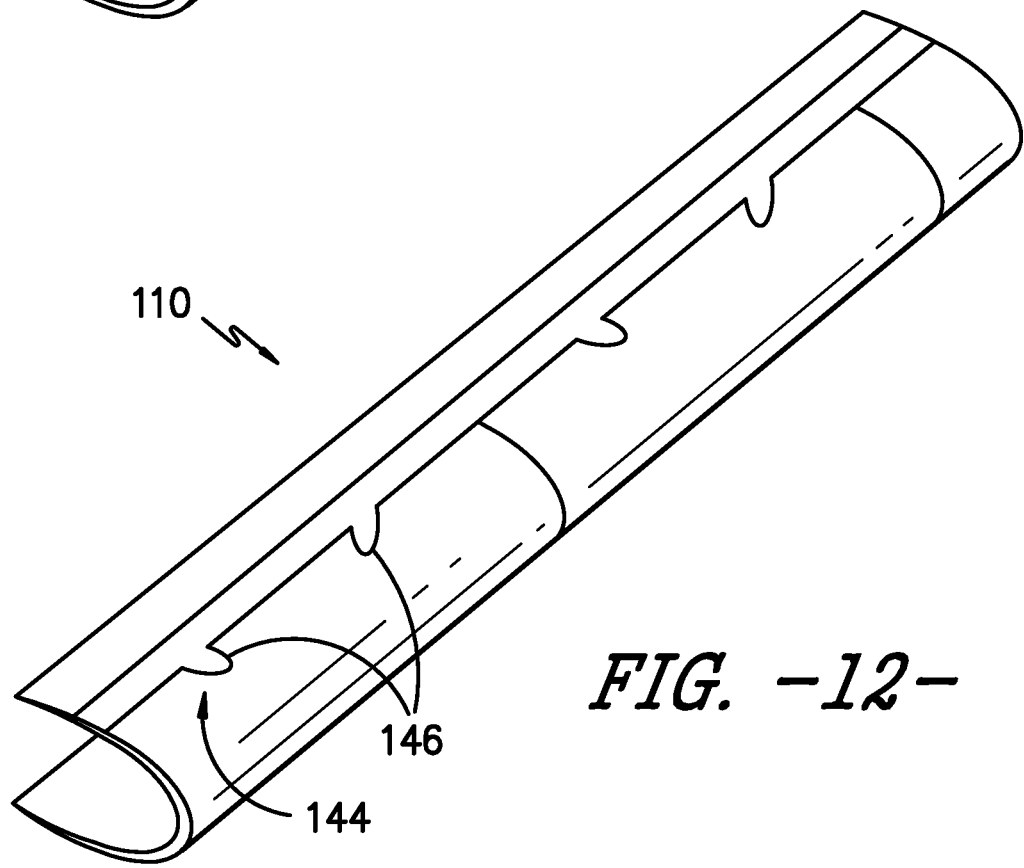
FIG. -12-

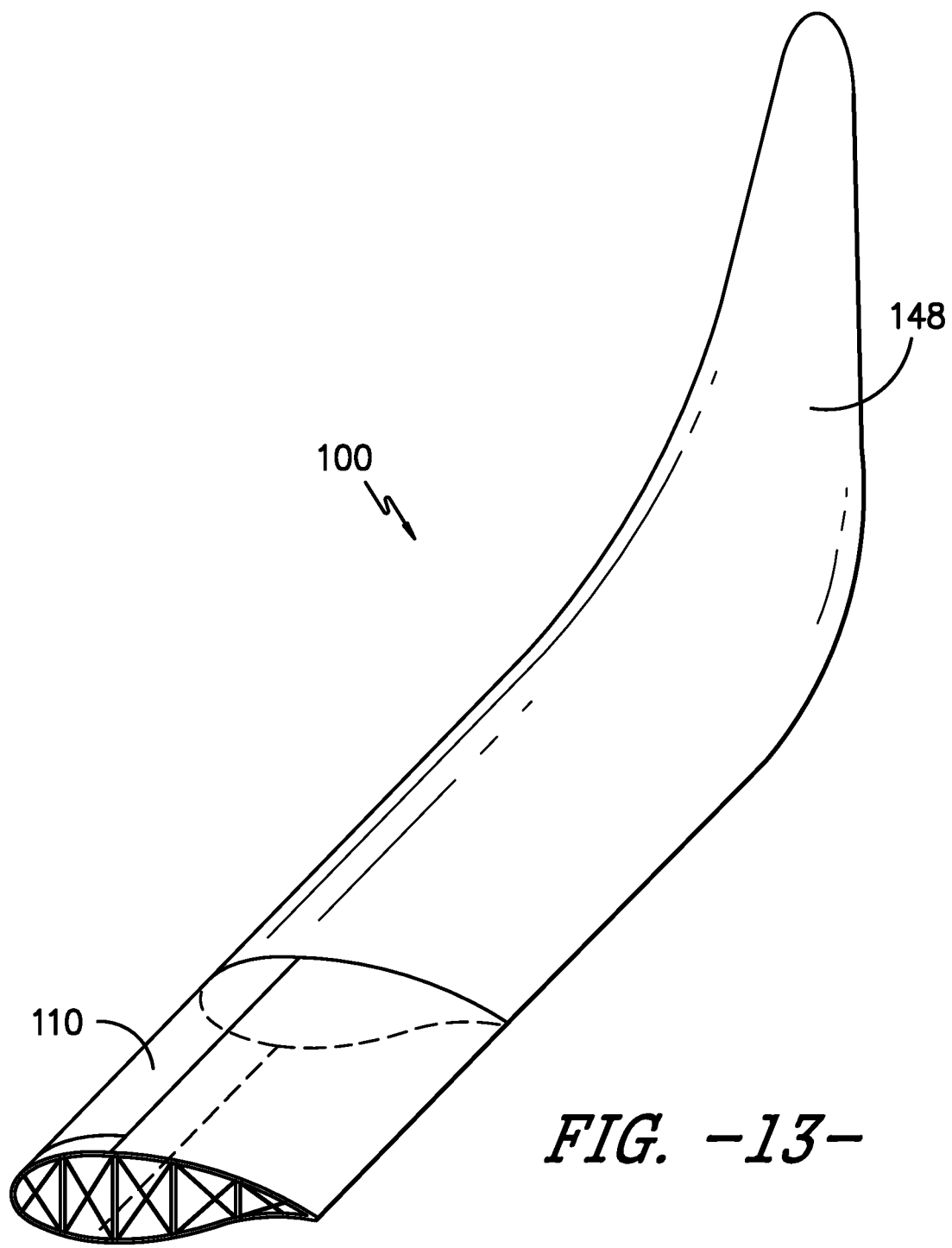
FIG. -13-

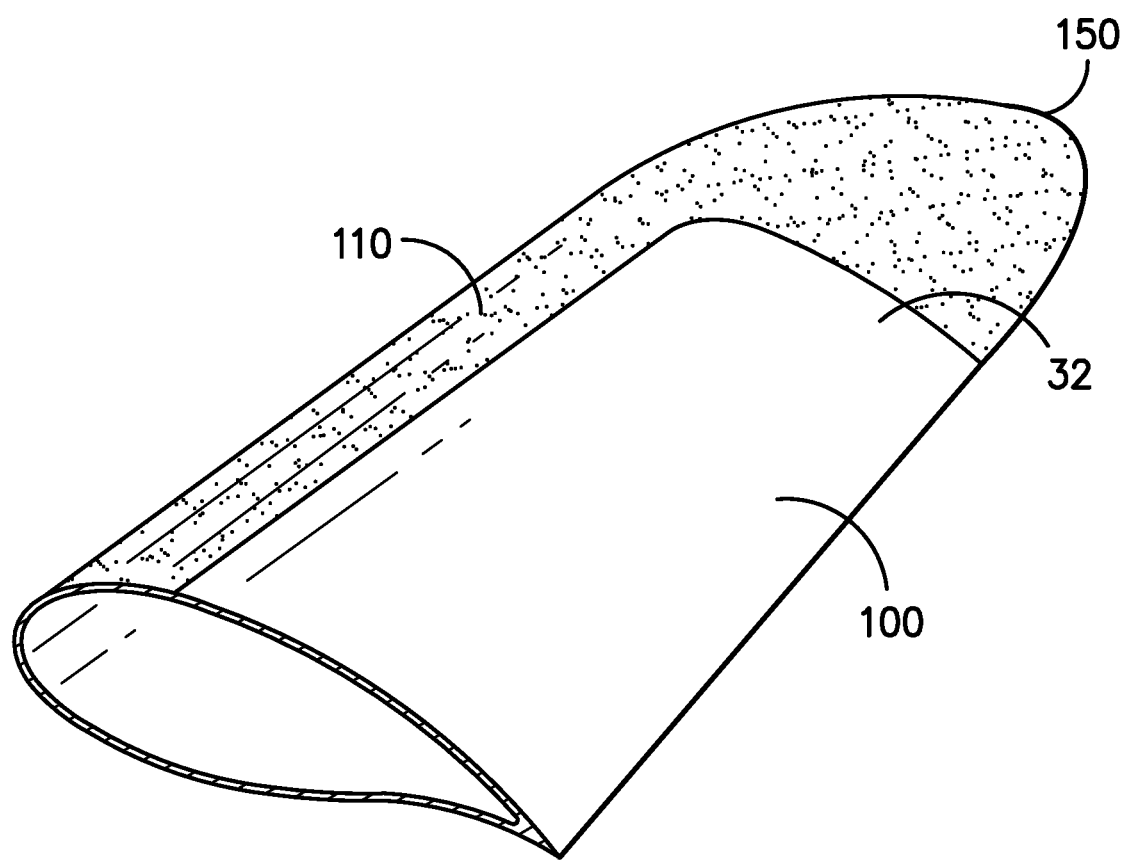
FIG. -14-

TUNGSTEN-BASED EROSION-RESISTANT LEADING EDGE PROTECTION CAP FOR ROTOR BLADES

FIELD

The present disclosure relates in general to rotor blades, and more particularly to tungsten-based leading edge protection caps for rotor blades to protect the rotor blades from erosion and/or corrosion.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During the operation of a wind turbine, the rotor blades may be subjected to a wide variety of environmental conditions. In many cases, such as when the wind turbines are located in coastal or desert areas or offshore, the rotor blades may be subjected to environmental conditions that include abrasive materials, such as sand particles, rain droplets, or seawater. The interaction of these abrasive materials with the rotor blades may cause portions of the rotor blades to erode. In particular, the leading edges of rotor blades may be highly susceptible to erosion. Erosion of the various portions of the rotor blades limits the maximum rotational speed of the rotor blades, thus limiting the power output of the wind turbine. More particularly, leading edge erosion can lead to the loss of surface roughness and/or chord loss, thereby resulting in performance loss and durability issues overtime.

Thus, an improved protection cap for a rotor blade that prevents erosion and/or corrosion would be welcomed in the art. In view of the foregoing, the present disclosure is directed to a tungsten-based metallic leading edge cap for wind turbine rotor blades that protects the blades from erosion.

BRIEF DESCRIPTION

Aspects and advantages of the invention will be set forth in part in the following description, or may be obvious from the description, or may be learned through practice of the invention.

In one aspect, the present disclosure is directed to a rotor blade assembly. The rotor blade assembly includes at least one rotor blade having surfaces defining a pressure side, a suction side, a leading edge, and a trailing edge extending between a blade tip and a blade root. The surfaces are constructed of a polymeric composite material. The rotor blade assembly also includes a protection cap arranged adjacent to one or more of the surfaces of the rotor blade so as to cover at least a portion of the one or more surfaces of the rotor blade. The protection cap includes a body defining an overall length. Further, at least a first segment of the protection cap is constructed of tungsten-based metal. Thus, the protection cap is configured to reduce erosion and resist corrosion of the rotor blade caused by particle or liquid impact.

In an embodiment, the tungsten-based metal may be, for example, elemental tungsten, tungsten titanium, tungsten silicon, tungsten nickel, or tungsten aluminum. Further, in an embodiment, the protection cap may cover at least a portion of the leading edge of the rotor blade. In another embodiment, the tungsten-based metal may be formed into at least one of foil, one or more strips, one or more plates, or one or more sheets.

In particular embodiments, the protection cap may be secured to the one or more of the surfaces via an adhesive.

In further embodiments, the protection cap may have a clip-on spring configuration that clips onto the one or more of the surfaces of the rotor blade. In such embodiments, a thickness of a cross-section of the clip-on spring configuration varies along at least a portion of the overall length of the protection cap. In additional embodiments, the clip-on spring configuration may also include at least one of internal thickened edges or external thickened edges.

In alternative embodiments, the protection cap may have a clip-in configuration that is secured at least partially within an inner cavity of the rotor blade. In such embodiments, the clip-in configuration may include a protruding leading edge portion and opposing flanges. More particularly, in an embodiment, the opposing flanges may be secured to an inner surface of the one or more of the surfaces of the rotor blade within the inner cavity of the rotor blade.

In several embodiments, at least a second segment of the protection cap may be constructed of a polymeric material.

In yet another embodiment, the protection cap may be integrated with a lightning protection system of the rotor blade.

In another aspect, the present disclosure is directed to a method for manufacturing a rotor blade assembly. The method includes providing at least one rotor blade having surfaces defining a pressure side, a suction side, a leading edge, and a trailing edge extending between a blade tip and a blade root. Further, the surfaces are constructed of a polymeric composite material. The method also includes forming a protection cap having a shape that corresponds to a curvature of one or more of the surfaces of the rotor blade. A first segment of the protection cap is formed of a tungsten-based metal and a second segment of the protection cap is formed of a different material. Further, the method includes arranging the protection cap adjacent to one or more of the surfaces of the rotor blade so as to cover at least a portion of the one or more surfaces of the rotor blade. Moreover, the method includes securing the protection cap to the one or more of the surfaces of the rotor blade such that the first segment of the protection cap being formed of the tungsten-based metal is arranged adjacent to the blade tip. Thus, the protection cap is configured to reduce erosion and resist corrosion of the rotor blade caused by particle or liquid impact.

In an embodiment, forming the protection cap may include at least one of sheet press-forming, laser sheet forming, additive manufacturing, electroforming, cold spraying, rolling, surface hardening, coating deposition, sintering, or similar, as well as combinations thereof.

In another embodiment, the tungsten-based metal may include, for example, elemental tungsten, tungsten titanium, tungsten silicon, tungsten nickel, or tungsten aluminum, whereas the different material may include a polymeric material, a shape memory alloy, a nickel alloy (such as nickel chromium or nickel chromium molybdenum, as examples), an aluminum alloy, a titanium alloy, a steel alloy, or any other suitable material.

In further embodiments, securing the protection cap to the one or more of the surfaces of the rotor blade may include securing the protection cap to the one or more of the surfaces of the rotor blade via at least one of adhesive or mechanical engagement. For example, in an embodiment, the mechanical engagement may include a clip-on spring configuration, a clip-in configuration, or one or more fasteners.

Thus, wherein the mechanical engagement is the clip-on configuration, the method may include forming a thickness of a cross-section of the clip-on spring configuration to vary along at least a portion of the overall length of the protection cap via additive manufacturing, electroforming, cold spraying, or combinations thereof.

In additional embodiments, the method may also include forming at least one additional feature onto the protection cap via at least one of additive manufacturing, electroforming, cold spraying, rolling, surface hardening, or similar, as well as combinations thereof. In such embodiments, the additional feature(s) may include internal thickened edges, external thickened edges, one or more flanges, an aerodynamic surface feature, or any other suitable feature.

In another embodiment, the clip-in configuration may include a protruding leading edge portion and opposing flanges. In such embodiments, the method may include forming the leading edge portion of a first material and the opposing flanges of a second material, with the first and second materials being different and securing the opposing flanges to an inner surface of the one or more of the surfaces of the rotor blade within the inner cavity of the rotor blade.

In still further embodiments, the method may include integrating the protection cap with a lightning protection system of the rotor blade, e.g. via a rivet or bolt. It should be understood that the rotor blade may further include any of the additional features described herein.

In yet another aspect, the present disclosure is directed to a protection cap for arranging adjacent to one or more surfaces of a rotor blade so as to cover at least a portion of the one or more surfaces of the rotor blade. The protection cap includes a body defining an overall length with at least a first segment of the protection cap constructed of elemental tungsten. Further, the protection cap is configured to reduce erosion and resist corrosion of the rotor blade caused by particle or liquid impact.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade assembly according to the present disclosure;

FIG. 3 illustrates a cross-sectional view of one embodiment of a rotor blade assembly according to the present disclosure;

FIG. 4 illustrates a cross-sectional view of one embodiment of a protection cap for a rotor blade assembly according to the present disclosure;

FIG. 5 illustrates a cross-sectional view of another embodiment of a protection cap for a rotor blade assembly according to the present disclosure;

FIG. 6 illustrates a cross-sectional view of still another embodiment of a protection cap for a rotor blade assembly according to the present disclosure;

FIG. 7 illustrates a cross-sectional view of another embodiment of a rotor blade assembly according to the present disclosure;

FIG. 8 illustrates a cross-sectional view of another embodiment of a protection cap for a rotor blade assembly according to the present disclosure;

FIG. 9 illustrates a cross-sectional view of rotor blade surfaces of a rotor blade of a rotor blade assembly according to the present disclosure;

FIG. 10 illustrates a flow diagram of one embodiment of a method for manufacturing a rotor blade assembly of a wind turbine.

FIG. 11 illustrates a perspective view of one embodiment of a protection cap for a rotor blade assembly according to the present disclosure;

FIG. 12 illustrates a perspective view of another embodiment of a protection cap for a rotor blade assembly according to the present disclosure;

FIG. 13 illustrates a perspective view of still another embodiment of a protection cap for a rotor blade assembly according to the present disclosure; and FIG. 14 illustrates a perspective view of yet another embodiment of a protection cap for a rotor blade assembly according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a wind turbine 10 of conventional construction. As shown, the wind turbine 10 includes a tower 12 with a nacelle 14 mounted thereon. A plurality of rotor blades 16 are mounted to a rotor hub 18, which is in turn connected to a main flange that turns a main rotor shaft (not shown). The wind turbine power generation and control components are typically housed within the nacelle 14. The view of FIG. 1 is provided for illustrative purposes only to place the present invention in an exemplary field of use. It should be appreciated that the invention is not limited to any particular type of wind turbine configuration.

Referring now to FIG. 2, a perspective view of one of the rotor blades 16 of FIG. 1 according to the present disclosure is illustrated. As shown, the rotor blade may include surfaces defining a pressure side 22 (see e.g. FIG. 3) and a suction side 24 extending between a leading edge 26 and a trailing edge 28 and may extend from a blade tip 32 to a blade root 34. Further, in some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

Moreover, the rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10 and may further provide clearance for the rotor blade 16 from the tower 12 during operation of the wind turbine 10.

The rotor blade 16 may generally be formed of a polymeric composite material, such as an optionally reinforced thermoset or thermoplastic material. Thermoset materials generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials as described herein may generally include, but are not limited to, some polyesters, some polyurethanes, esters, epoxies, or any other suitable thermoset material.

In contrast, thermoplastics generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

As illustrated in FIGS. 2 through 13, the present disclosure may further be directed to a rotor blade assembly 100 and methods of manufacturing same. The rotor blade assembly 100 may be suitable for numerous applications, such as wind turbines, helicopters, engines, propellers, hovercrafts, etc. For example, as shown, the rotor blade assembly 100 includes the rotor blade 16 of the wind turbine 10, as discussed above. Further, the rotor blade assembly 100 includes a protection cap 110 configured to reduce erosion and resist corrosion of the rotor blade caused by particle or liquid impact, such as abrasive environmental conditions including, for example, sand particles, rain droplets, and/or seawater. Accordingly, the protection cap uniquely combines high resistance to corrosion degradation when the rotor blades are exposed to environments containing corrosive species, fog, mist, water, etc. Moreover, as shown, the protection cap 110 is arranged adjacent to one or more of the surfaces of the rotor blade 16 so as to cover at least a portion of the one or more surfaces of the rotor blade 16. For example, as shown in FIG. 2, the protection cap 110 may cover at least a portion of the leading edge 26 of the rotor blade 16. In such embodiments, the protection cap 110 may extend at least partially onto the pressure side 22 and/or the suction side 24, as desired to provide suitable erosion protection. Additionally, or alternatively, the protection cap 110 may be configured on any suitable surface or surfaces of the rotor blade 16, such as the pressure side 22, the suction side 24, the trailing edge 28, the tip 32, and/or the root 34.

In further embodiments, the protection cap 110 may be configured on only a portion of the rotor blade 16 along the length of the rotor blade in the generally span-wise direction. For example, the protection cap 110 may be configured on approximately the outer half of the length of the rotor blade 16 or, in exemplary embodiments, approximately the outer third of the length of the rotor blade 16 (in other words, the approximate half or third of the length of the rotor blade 16 that includes the tip 32). Thus, the protection cap 110 may extend in the generally span-wise direction along substantially the entire outer half of the rotor blade 16, or along substantially the entire outer third of the rotor blade 16.

However, it should be understood that the present disclosure is not limited to the protection cap 110 being configured on or extending through only a certain portion of the spanwise or chordwise length of the rotor blade 16. Rather, any configuration of the protection cap 110 on any portion of the length of the rotor blade 16 is within the scope of the present disclosure.

Moreover, the protection cap 110 may be formed of a single piece of material or constructed of a plurality of segments. For example, as shown in FIG. 2, the protection cap 110 is formed of a plurality of segments. More specifically, as shown, the plurality of segments may include, at least, a first segment 114 and a second segment 116. Thus, the various segments can be formed of varying materials or the same materials. In particular embodiments, the first segment 114, for example, may be constructed of a tungsten-based metal such as elemental tungsten (which can include pure elemental tungsten). As used herein, "pure elemental tungsten" refers to elemental tungsten having a high purity up to 100% purity, though 100% purity is not necessarily required. Thus, it should be understood that "pure elemental tungsten" generally includes commercially pure elemental tungsten which may have a purity of less than 100%. For example, in an embodiment, the pure elemental tungsten may be of a grade having a purity of at least about 75%, or more preferably about 80%, or more preferably about 90%, or even more preferably about 99.95%. Moreover, pure elemental tungsten generally has high modulus. For example, in an embodiment, the Young's modulus of the pure elemental tungsten may be at least about 400 gigapascals (GPa), as compared to other elements. Further, in an embodiment, the shear modulus of the pure elemental tungsten may be at least about 150 GPa. Thus, the high modulus provides stiffness and damping to the protective cap 110 (especially of the shock waves generated due to droplet impact). More specifically, during water droplet impact, repeated shock waves are generated within the blade material which leads to fatigue-related material failure over time. Pure elemental tungsten, by virtue of its high modulus and stiffness, can absorb the acoustic shock waves, thereby ensuring the material deformation remains elastic. This enables delayed damage initiation and helps maintain the blade aerodynamic surface for longer duration.

Pure elemental tungsten is also highly resistant to corrosion, such as those found in sea environments. For example, pure elemental tungsten is generally inert to general chemical environments including oxygen at room temperature and its reactivity increases with increase in temperature. Thus, in sea environments (which are usually acidic), pure elemental tungsten can be more resistant to corrosion than other alkaline mediums. Furthermore, where pure elemental tungsten is used without any other element, high corrosion-resistance is maintained as corrosion-resistance reduces in the presence of binder phases (including attack on inter-granular boundaries of different phases).

This combination of erosion and corrosion resistance is unique. On the other hand, cermet materials, such as tungsten carbide (in sintered or coated form) are prone to droplet erosion and/or corrosion damage due to the presence of carbide binder interfaces which become sites for erosion and/or corrosion damage.

Further, the tungsten-based metal may be formed into any suitable shape having any suitable thickness. For example, in an embodiment, the tungsten-based metal described herein may be formed into one or more foil sheets of material. In another embodiment, the tungsten-based metal may formed into one or more strips. In still another embodiment, the tungsten-based metal may be formed into one or more plates or one or more sheets.

In another embodiment, the second segment(s) 116, where applicable, may be constructed of a different material, such as a polymeric material, a nickel alloy (such as nickel chromium or nickel chromium molybdenum, as examples), an aluminum alloy, a titanium alloy, a steel alloy, or any other suitable material.

In particular embodiments, the protection cap 110 may be secured to the rotor blade surface(s) using any suitable means, such via an adhesive, mechanical engagement, or one or more fasteners, and/or combinations thereof. Further, as shown in FIGS. 3-6, the protection cap 110 may have a clip-on spring configuration that clips onto the rotor blade surface(s), such as around the leading edge 26 or in the absence of a leading edge, to the pressure and suction side surfaces 22, 24. In addition, as shown generally in FIGS. 4-6, in such embodiments, the protection cap 110 includes a body 112 defining an overall length L. Further, in some embodiments, the thickness T of the protection cap 110 in general, may taper or vary throughout a portion of the protection cap 110, e.g. along at least a portion of the overall length L of the protection cap 110. For example, as shown in FIGS. 4-6, the thickness T of the body 112 of the protection cap 110 is greater in the middle of the protection cap 110 (as shown at $T_2$) than at the edges (as shown at $T_1$).

In additional embodiments, the clip-on spring configuration may also include at least one of internal thickened edges or external thickened edges. For example, as shown in FIG. 5, the clip-on spring configuration of the protection cap 110 may include external thickened edges 118. Alternatively, as shown in FIG. 6, the clip-on spring configuration of the protection cap 110 includes internal thickened edges 120. Such edges may, for example, be provided onto the body 112 of the protection cap 110 via any suitable method, such as by additively manufacturing the edges 118, 120 onto the body 112, bonding the edges 118, 120 onto the body 112, fastening the edges 118, 120 onto the body 112, or similar. Thus, in such embodiments, the thickened edges 118, 120 are configured to avoid end cracks in the protection cap 110.

In alternative embodiments, as shown in FIGS. 7-9, the protection cap 110 may have a clip-in configuration that is secured at least partially within an inner cavity 122 of the rotor blade 16. In such embodiments, the clip-in configuration may include a protruding leading edge portion 124 and opposing flanges 126, 128. More particularly, in an embodiment, as shown in FIGS. 7 and 9, the opposing flanges 126, 128 may be secured to an inner surface 130 of one or more of the surfaces of the rotor blade 16, e.g. within the inner cavity 122 of the rotor blade 16. In such embodiments, the clip-in configuration of the protection cap 110 may also be spring-like, such that the opposing flanges 126, 128 can be biased towards each other for inserting the protection cap 110 into an opening 132 (FIG. 9) defined by the pressure and side surfaces 22, 24. Accordingly, once inserted as shown in FIG. 7, the leading edge portion 124 defines the leading edge 26 of the rotor blade 16.

In addition, the leading edge portion 124 and the opposing flanges 126, 128 may be formed of any suitable material(s). In one embodiment, the leading edge portion 124 and the opposing flanges 126, 128 may be formed of the same material. Alternatively, in another embodiment, the leading edge portion 124 may be formed of a first material and the opposing flanges 126, 128 may be formed of a second material, with the first and second materials being different. In such embodiments, an electroforming process may be used to form the protection cap 110 of differing materials.

Referring back to FIG. 2, the protection cap 110 may be integrated with a lightning protection system 134 of the rotor blade 16. More particularly, as shown, the lightning protection system 134 may include at least one receptor 136 that can be electrically coupled to the protection cap 110, e.g. via one or more lightning protection devices 138, and to ground so as to reduce lightning damage to the rotor blade 16. For example, the lightning receptor(s) 136 may include a material suitable for conducting the electrical current from a lightning strike to ground. In exemplary embodiments, the lightning receptor(s) 136 may be formed from a metal or metal alloy. For example, the lightning receptor(s) 136 may be formed from aluminum. Alternatively, however, the lightning receptor(s) 136 may be formed from any suitable conductive material. Accordingly, the lightning receptor(s) 136 may correspond to a bolt or rivet. Further, in an embodiment, the lightning protection device(s) 138 may be a cable, such as a copper cable.

Thus, the protection cap 110 may be fastened or otherwise secured to the rotor blade 16 through the lightning receptor(s) 136 (e.g. via one or more rivets). Accordingly, as shown in FIG. 11, the protection cap 110 may include one or more through holes 145 for receiving the lightning receptor(s) 136. The aspect of fastening the protection cap 110 by making through holes, such as fish eye holes on the cap 110 which can then be bolted to the rotor blade 16 provides lightning protection to the protection cap 110 and also secures the protection cap 110 in the event of de-bond from the rotor blade 16 during service. It should be understood that any suitable number of riveting locations can also be provided to fasten the protection cap 110 to the rotor blade 16.

Still referring to FIG. 2, as shown, the lightning protection device(s) 138 may be disposed at least partially in the interior of the rotor blade 16, e.g. within the inner cavity 122 of the rotor blade 16. For example, the lightning protection device(s) 138 may extend in the interior through at least a portion of the length of the rotor blade 16. Moreover, in some embodiments, the lightning protection device(s) 138 may be connected at various locations along the length of the rotor blade 16 to one or more of the lightning receptors 136 disposed on one or more of the surfaces of the rotor blade 16. It should be understood that the protection cap 110 may replace or supplement some of the lightning receptors. The lightning protection device 138 may further be in conductive communication with a grounding system (not shown) in the wind turbine 10, such as in the tower 12 of the wind turbine 10.

Referring now to FIG. 10, a flow diagram of one embodiment of a method 200 for manufacturing a rotor blade assembly of a wind turbine, such as rotor blade assembly 100, is illustrated. In general, the method 200 is described herein as implemented for manufacturing the rotor blade assembly 100 described above. However, it should be appreciated that the disclosed method 200 may be used to manufacture any other rotor blade assemblies and/or protection caps. In addition, although FIG. 10 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (202), the method 200 includes providing a rotor blade having surfaces defining a pressure side, a suction side, a leading edge, and a trailing edge extending between a blade tip and a blade root. As shown at (204), the method 200 includes forming a protection cap 110 having a shape that corresponds to a curvature of one or more of the surfaces of the rotor blade 16. More particularly, in an embodiment, the protection cap 110 may be formed via sheet press-forming, laser sheet forming, additive manufacturing, electroforming, cold spraying, rolling, surface hardening, coating deposition, sintering, or similar, as well as combinations thereof.

Further, as mentioned, the protection cap 110 may be formed of a plurality of segments. More particularly, in such embodiments, a first segment 114 of the protection cap 110 may be formed of a tungsten-based metal, whereas a second segment 116 of the protection cap 110 may be formed of a different material. In particular embodiments, the tungsten-based metal may include, for example, pure elemental tungsten, tungsten titanium, tungsten silicon, tungsten nickel, or tungsten aluminum, whereas the different material may include a polymeric material, a shape memory alloy, a nickel alloy (such as nickel chromium or nickel chromium molybdenum, as examples), an aluminum alloy, a titanium alloy, steel, or any other suitable material.

Referring still to FIG. 10, as shown at (206), the method 200 includes arranging the protection cap 110 adjacent to one or more of the surfaces of the rotor blade 16 so as to cover or form at least a portion of the one or more surfaces of the rotor blade 16. As shown at (208), the method 200 includes securing the protection cap 110 to the one or more of the surfaces of the rotor blade 16 such that the first segment 114 of the protection cap 110 (which is formed of the tungsten-based metal) is arranged adjacent to the blade tip 32. Thus, the protection cap 110 is configured to reduce erosion and resist corrosion of the rotor blade 16 caused by particle or liquid impact.

For example, in an embodiment, the protection cap 110 may be secured to one or more of the rotor blades surfaces via at least one of adhesive, mechanical engagement, or any other suitable securement methods. For example, in an embodiment, as mentioned, the mechanical engagement may include a clip-on spring configuration (e.g. exterior to one or more of the rotor blade surfaces) or a clip-in configuration (e.g. interior to one or more of the rotor blade surfaces).

Thus, wherein the mechanical engagement is the clip-on configuration, the method 200 may include forming a thickness of a cross-section of the clip-on spring configuration to vary along at least a portion of the overall length of the protection cap 110, e.g. via additive manufacturing, electroforming, cold spraying, or combinations thereof. Alternatively, the thickness of the cross-section of the clip-on spring configuration may be constant along the overall length of the protection cap 110.

In additional embodiments, as shown generally in FIGS. 5-6 and 11-13 for example, the method 200 may also include forming at least one additional feature onto the protection cap 110 via at least one of additive manufacturing, electroforming, cold spraying, rolling, surface hardening, or similar, as well as combinations thereof. In such embodiments, the additional feature(s) may include the internal thickened edges 124, the external thickened edges 122, one or more flanges 126, 128, an aerodynamic surface feature 144, or any other suitable feature. For example, as shown in FIGS. 11 and 12, the protection cap 110 is formed having a plurality of vortex generators 146 thereon. In another embodiment, as shown in FIG. 13, the protection cap 110 may be formed or otherwise attached to an additively-manufactured metallic grid-stiffened winglet 148. In such embodiments, the protection cap 110 may be secured to the blade tip 32 of the rotor blade 16 so as to alter one or more aerodynamic properties of the tip 32. In yet another embodiment, as shown in FIG. 4, the protection cap 110 may further include a tip portion 150 formed or otherwise secured to the blade tip 32 of the rotor blade 16 so as to alter one or more aerodynamic properties of the tip 32.

In still further embodiments, as mentioned in reference to FIG. 2, the method 200 may include integrating the protection cap 110 with the lightning protection system 134 of the rotor blade 16, e.g. via a rivet or bolt, and using the methods described herein.

Various aspects and embodiments of the present invention are defined by the following numbered clauses:

Clause 1. A rotor blade assembly, comprising:

at least one rotor blade having surfaces defining a pressure side, a suction side, a leading edge, and a trailing edge extending between a blade tip and a blade root, the surfaces constructed of a polymeric composite material; and, a protection cap arranged adjacent to one or more of the surfaces of the rotor blade so as to cover at least a portion of the one or more surfaces of the rotor blade, the protection cap comprising a body defining an overall length, at least a first segment of the protection cap constructed of a tungsten-based metal, wherein the protection cap is configured to reduce erosion and resist corrosion of the rotor blade caused by particle or liquid impact.

Clause 2. The rotor blade assembly of clause 1, wherein the protection cap covers at least a portion of the leading edge of the rotor blade.

Clause 3. The rotor blade assembly of any of the preceding claims, wherein the tungsten-based metal comprises at least one of elemental tungsten, tungsten titanium, tungsten silicon, tungsten nickel, or tungsten aluminum.

Clause 4. The rotor blade assembly of any of the preceding claims, wherein the tungsten-based metal is formed into at least one of foil, one or more strips, one or more plates, or one or more sheets.

Clause 5. The rotor blade assembly of any of the preceding claims, wherein the protection cap is secured to the one or more of the surfaces via an adhesive.

Clause 6. The rotor blade assembly of any of the preceding claims, wherein the protection cap comprises a clip-on spring configuration that clips onto the one or more of the surfaces of the rotor blade.

Clause 7. The rotor blade assembly of clause 6, wherein a thickness of a cross-section of the clip-on spring configuration varies along at least a portion of the overall length of the protection cap.

Clause 8. The rotor blade assembly of clause 7, wherein the clip-on spring configuration further comprises at least one of internal thickened edges or external thickened edges.

Clause 9. The rotor blade assembly of any of the preceding claims, wherein the protection cap comprises a clip-in configuration that is secured at least partially within an inner cavity of the rotor blade.

Clause 10. The rotor blade assembly of clause 9, wherein the clip-in configuration comprises a protruding leading edge portion and opposing flanges, the opposing flanges secured to an inner surface of the one or more of the surfaces of the rotor blade within the inner cavity of the rotor blade.

Clause 11. The rotor blade assembly of any of the preceding claims, wherein at least a second segment of the protection cap is constructed of a polymeric material.

Clause 12. The rotor blade assembly of any of the preceding claims, wherein the protection cap is integrated with a lightning protection system of the rotor blade.

Clause 13. A method for manufacturing a rotor blade assembly, the method comprising:
providing at least one rotor blade having surfaces defining a pressure side, a suction side, a leading edge, and a trailing edge extending between a blade tip and a blade root, the surfaces constructed of a polymeric composite material;
forming a protection cap having a shape that corresponds to a curvature of one or more of the surfaces of the rotor blade, wherein a first segment of the protection cap is formed of a tungsten-based metal and a second segment of the protection cap is formed of a different material;
arranging the protection cap adjacent to one or more of the surfaces of the rotor blade so as to cover at least a portion of the one or more surfaces of the rotor blade; and,
securing the protection cap to the one or more of the surfaces of the rotor blade such that the first segment of the protection cap being formed of the tungsten-based metal is arranged adjacent to the blade tip, the protection cap configured to reduce erosion and resist corrosion of the rotor blade caused by particle or liquid impact.

Clause 14. The method of clause 13, wherein forming the protection cap further comprises at least one of sheet press-forming, laser sheet forming, additive manufacturing, electroforming, cold spraying, rolling, surface hardening, coating deposition, sintering, or combinations thereof.

Clause 15. The method of clauses 13-14, wherein the tungsten-based metal comprises at least one of elemental tungsten, tungsten titanium, tungsten silicon, tungsten nickel, or tungsten aluminum, the different material comprises at least one of a polymeric material, a shape memory alloy, a nickel alloy, an aluminum alloy, a titanium alloy, or a steel alloy.

Clause 16. The method of clauses 13-15, wherein securing the protection cap to the one or more of the surfaces of the rotor blade further comprises securing the protection cap to the one or more of the surfaces of the rotor blade via at least one of adhesive or mechanical engagement, the mechanical engagement comprising at least one of a clip-on spring configuration, a clip-in configuration, or one or more fasteners.

17. The method of clause 16, further comprising forming a thickness of a cross-section of the clip-on spring configuration to vary along at least a portion of the overall length of the protection cap via at least one of additive manufacturing, electroforming, cold spraying, or combinations thereof.

Clause 18. The method of clause 16, further comprising forming at least one additional feature onto the protection cap via at least one of additive manufacturing, electroforming, cold spraying, or combinations thereof, the at least one additional feature comprising at least one of internal thickened edges, external thickened edges, one or more flanges, or an aerodynamic surface feature.

Clause 19. The method of clause 16, wherein the clip-in configuration comprises a protruding leading edge portion and opposing flanges, the method further comprising:
forming the leading edge portion of a first material and the opposing flanges of a second material, the first and second materials being different;
securing the opposing flanges to an inner surface of the one or more of the surfaces of the rotor blade within the inner cavity of the rotor blade.

Clause 20. A protection cap for arranging adjacent to one or more surfaces of a rotor blade so as to cover at least a portion of the one or more surfaces of the rotor blade, the protection cap comprising:
a body defining an overall length,
wherein at least a first segment of the protection cap is constructed of elemental tungsten, and
wherein the protection cap is configured to reduce erosion and resist corrosion of the rotor blade caused by particle or liquid impact.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a rotor blade assembly, the method comprising:
providing a rotor blade having surfaces defining a pressure side, a suction side, a leading edge, and a trailing edge extending between a blade tip and a blade root;
forming a sheet of a tungsten-based metal;

forming, via sheet press-forming, a protection cap comprising the tungsten-based metal sheet having a shape that corresponds to a curvature of the surfaces of the rotor blade, and forming at least one additional feature onto the protection cap via at least one of additive manufacturing, electroforming, cold spraying, or combinations thereof, wherein the at least one additional feature comprises at least one of internal thickened edges, external thickened edges, or one or more flanges;

arranging the protection cap adjacent to the surfaces of the rotor blade defining the curvature, so as to cover at least a portion of the surfaces of the rotor blade; and, securing the protection cap to the surfaces of the rotor blade defining the curvature such that the tungsten-based metal sheet, of the protection cap, having the shape that corresponds to the curvature is arranged adjacent to the blade tip and such that the protection cap is secured to the surfaces of the rotor blade via at least one of a clip-on spring configuration, a clip-in configuration, or one or more fasteners.

2. The method of claim 1, wherein the tungsten-based metal comprises at least one of elemental tungsten, tungsten titanium, tungsten silicon, tungsten nickel, or tungsten aluminum.

3. The method of claim 1, further comprising forming a thickness of a cross-section of the clip-on spring configuration to vary along at least a portion of an overall length of the protection cap via at least one of additive manufacturing, electroforming, cold spraying, or combinations thereof.

4. The method of claim 1, wherein the clip-in configuration comprises a protruding leading edge portion and opposing flanges, the method further comprising securing the opposing flanges to an inner surface of the the surfaces of the rotor blade within an inner cavity of the rotor blade.

5. The method of claim 1, wherein the method is for manufacturing the rotor blade assembly for a wind turbine.

* * * * *